July 19, 1938.  T. T. ALKIN  2,124,024
POWER CHISEL APPARATUS
Filed Jan. 7, 1937
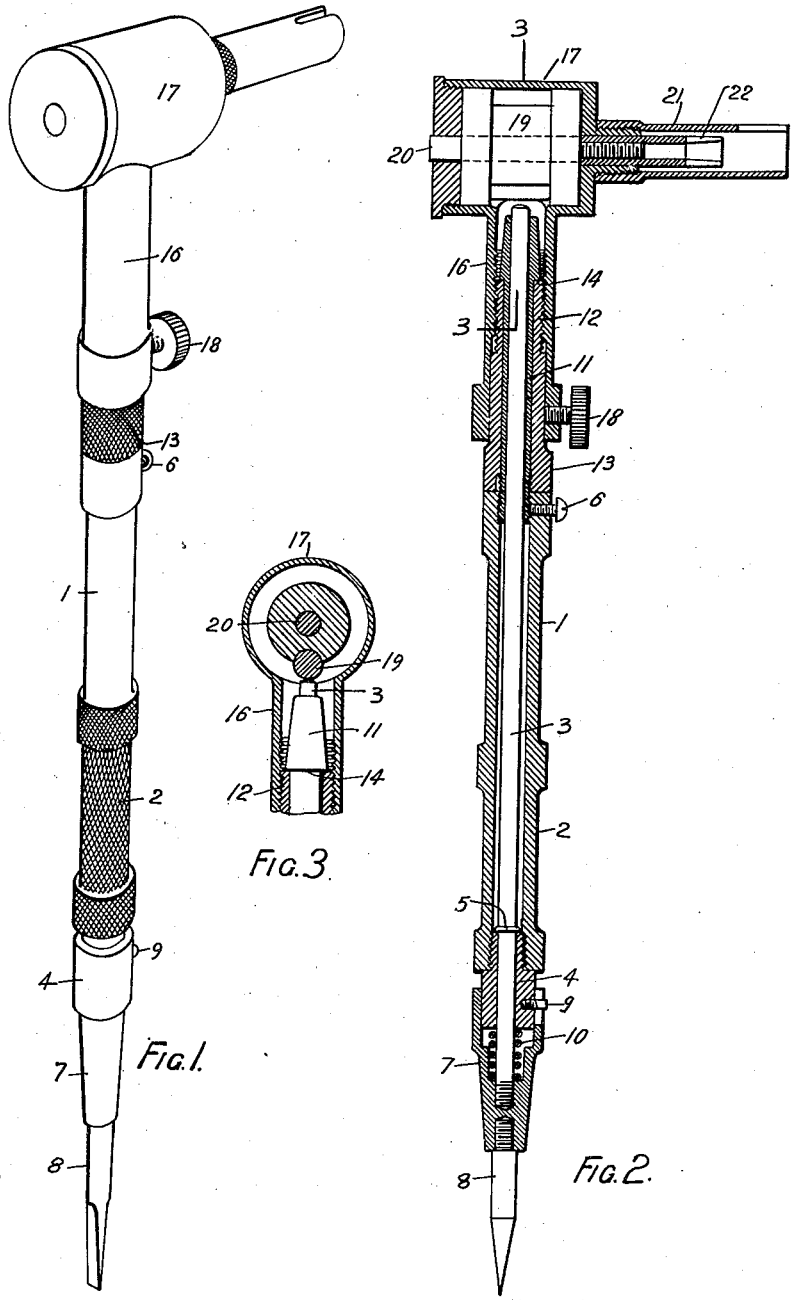
Thomas Turner Alkin
INVENTOR
By [signature]
his ATTY.

Patented July 19, 1938

2,124,024

UNITED STATES PATENT OFFICE 2,124,024

POWER CHISEL APPARATUS

Thomas Turner Alkin, Sydney, New South Wales, Australia

Application January 7, 1937, Serial No. 119,401
In Australia January 22, 1936

3 Claims. (Cl. 32—53)

This invention relates to power chisel apparatus which is especially applicable for use by dentists in connection with the surgical removal of teeth as well as for use by surgeons in connection with bone work, though it is also useful for sculptors, engravers, and others.

Referring to the accompanying drawing in which the invention is illustrated, Fig. 1 is a perspective view of the complete apparatus; Fig. 2 is a central sectional elevation of Fig. 1; and Fig. 3 is a sectional view on line 3—3, Fig. 2.

The chisel apparatus has a tubular handle or handpiece 1 which is furnished with a suitable knurled finger grip portion 2. Reciprocably arranged within the handle 1 is a plunger rod 3 one end of which is adapted to pass through a removably affixed bush bearing 4; said plunger rod 3 has a collar 5 adapted to engage with the head of the bush bearing 4.

At its lower end the plunger rod 3 is screwthreaded to adapt it to be screwed into a conically shaped tool holder 7 to which a chisel 8 is attachable. Tool holder 7 is slidably secured to the bush bearing 4 by the screw pin 9 whereby the plunger rod 3 and chisel 8 are prevented from rotation. Located between the bottom of the bush bearing 4 and the interior of the tool holder 7 is a compressible coil spring 10, the latter surrounding portion of the lower end of the plunger rod 3.

Removably secured to the other end of the handle 1 is a tubular extension 11 which also forms a bearing for the upper portion of the plunger rod 3. Mounted on the tubular extension 11 is a sleeve 12 which is furnished with a knurled head 13 adapted to abut the handle 1; the other end of the sleeve 12 is adapted to abut a shoulder 14 on the tubular extension 11. The latter is secured from rotation on the handle 1 by the pinching screw 6.

Said sleeve 12 is adjustably mounted within a tubular extension 16 of a cylindrical casing 17, the extension 16 being furnished with a clamping screw 18. Rotatably mounted within the casing 17 is a cam 19 adapted when rotated to actuate the plunger rod 3; other suitable actuating means may be employed for the plunger rod 3 than the cam 19. The cam 19 is affixed to the spindle 20 one end of which projects into a tubular housing 21 which is secured to the casing 17; the spindle 20 has bearings in the casing 17 and the housing 21. Spindle 20 is furnished at one end with clutch connectable means 22 and it may be driven by any suitable power means, such means being clutch connectable thereto.

While the cam 19 is rotating and the chisel 8 is free of engagement with a workpiece, the spring 10 located between the bush bearing 4 and the tool holder 7 will hold the plunger rod 3 free of the cam 19; consequently the plunger rod 3 will not be reciprocated.

Immediately the chisel 8 is brought into contact with the workpiece, the spring 10 will be compressed and the cam 19 allowed to engage the head of the plunger rod 3 to permit reciprocation of the latter.

The length of stroke of the plunger rod 3 can be regulated by adjusting the tubular extension 16 in relation to the sleeve 12 whereby the distance between the head of the plunger rod 3 and the cam 19 can be set as desired. The extent of blow or impact of the chisel 8 upon the workpiece is thus regulated.

What I claim as my invention and desire to secure by Letters Patent is:—

1. In a power chisel of the character described, the combination of a handle, a plunger rod reciprocally housed in said handle, a rotary hammer at the head of the handle to strike the plunger when the latter is moved into the path of movement of the hammer, a bushing carried by the working end of the handle forming a bearing and an abutment for the plunger rod, a tool holder attachably connected to the end of the rod and slidable over the bushing in an axial direction only, and resilient means interposed between the bushing and tool holder to normally project the tool holder and bring the plunger rod out of engagement by the rotary hammer and to yield under pressure exerted on the tool holder in operation to bring the rod into position to be engaged by said hammer.

2. A power chisel, as claimed in claim 1, including an extension for the upper end of the handle, a housing attachably connected to the upper end of the extension forming a bearing for and enclosing the rotary hammer, the rotary axis thereof being at right angles to that of the plunger rod, and a bushing for the upper portion of the plunger having a head portion arranged within the housing and abutting the end of the extension and being threaded at its lower end into the handle.

3. A power chisel, as claimed in claim 1, in which the tool holder is provided with an axially disposed slot in the portion thereof embracing the bushing and a pin projecting radially of the latter to enter the slot in the holder to prevent axial rotation of the plunger with respect to the handle.

THOMAS TURNER ALKIN.